United States Patent [19]

Eustacchio

[11] 4,075,311

[45] Feb. 21, 1978

[54] PROCESS FOR PREPARING GRANULATED MAGNESIUM HYDROXIDE AND MAGNESIA OF A LARGE SPECIFIC SURFACE

[75] Inventor: Peter Eustacchio, Leoben, Austria

[73] Assignee: Veitscher Magnesitwerke-Actien-Gesellschaft, Vienna, Austria

[21] Appl. No.: 653,223

[22] Filed: Jan. 28, 1976

[30] Foreign Application Priority Data

Jan. 31, 1975 Austria ................................. 741/75

[51] Int. Cl.$^2$ .............................................. C01F 5/16
[52] U.S. Cl. .................................................. 423/636
[58] Field of Search ....................... 423/635, 636, 155

[56] References Cited

U.S. PATENT DOCUMENTS

| 2,478,593 | 8/1949 | Pike | 423/636 |
| 3,471,259 | 10/1969 | Sese | 423/636 |
| 3,689,218 | 9/1972 | Hodges | 423/636 |
| 3,800,032 | 3/1974 | Eberle et al. | 423/636 |

OTHER PUBLICATIONS

Boyston, Chemistry and Technology of Lime and Limestone, Interscience Publishers (1966), pp. 301–303.

*Primary Examiner*—O. R. Vertiz
*Assistant Examiner*—Wayne A. Langel
*Attorney, Agent, or Firm*—Kurt Kelman

[57] ABSTRACT

Granulated magnesium hydroxide is prepared by agglomerating finely divided magnesia with water as a binding agent to produce granules, the water serving to hydrate the magnesia. The magnesium hydroxide may be thermally decomposed to obtain magnesia of a large specific surface, such as microporous magnesia.

33 Claims, No Drawings

PROCESS FOR PREPARING GRANULATED MAGNESIUM HYDROXIDE AND MAGNESIA OF A LARGE SPECIFIC SURFACE

The present invention relates to the preparation of granulated magnesium hydroxide by hydrating magnesia and, in one aspect thereof, to the thermal decomposition of the magnesium hydroxide to obtain magnesia of a large specific surface.

In one known process, magnesia obtained by thermal hydrolysis is introduced into water to hydrate the same, the amount of water exceeding that of the magnesia by about 5 to 10 times, the magnesia being suspended in the water and the suspension being heated to accelerate the hydration reaction. This produces an aqueous suspension of magnesium hydroxide and the magnesium hydroxide is then mechanically separated from the suspension, the resultant filter cake containing about 50% water. This is then granulated with the addition of previously dried, pulverized magnesium hydroxide, if desired, and the granules are subjected to heat to dry them. This process requires large apparatus and a high expenditure of time and energy since the large excess amount of water is heated to accelerate the reaction and a relatively large amount of water remains in the filter cake, which must be evaporated by a corresponding amount of heat.

It is the primary object of this invention to improve the production of magnesium hydroxide granules from magnesia by reducing the apparatus, time and energy requirements.

It is another object of the invention to provide an improved process for preparing magnesia of a large specific surface.

The above and other objects and advantages are accomplished in accordance with the present invention by agglomerating finely divided magnesia by the addition of sufficient water to act as a binding agent for producing granules, and hydrating the magnesia with the added water. The granules may be subjected to heat, either during or after agglomeration, to inititate the exothermic hydration reaction.

If desired, the autogenously dried magnesium hydroxide may be thermally decomposed to obtain magnesia of a large specific surface, for instance microporous magnesia, in granular form.

With the process of this invention, magnesium hydroxide in granulated form is obtained in a fast and simple step with little expenditure of time or energy. The resultant granules have a high stability and, therefore, may be handled simple without any substantial dusting problem. The granules are practically dry without any need for supplying external heat energy for drying. Since the hydration reaction is exothermic, any heat supplied to inititate the reaction may be held to a low level. All of these advantages are obtained by reversing the conventional procedure of first hydrating in an excess of water and then granulating the hydrate, the magnesia in the process of the invention being first granulated and the water, which serves as a binding agent in the agglomeration, continuing then to serve as a hydrating agent immediately following the agglomeration. Since the hydration proceeds exothermically, it often starts in short time after the water has been added to the finely divided magnesia, depending on the grain size of the magnesia or its porosity and the like. After hydration has been initiated, the reaction accelerates and releases heat, causing evaporation of any excess water needed for the agglomeration. The resultant product are autogenously dried granules and no external heat is required for drying.

A preferred starting product is magnesia calcined or burned at temperatures below 1200° C because this type of magnesia is quickly and readily granulated by adding water as a binding agent, hydration of such magnesia starts quickly, the heat produced by the exothermic reaction accelerates the hydration and evaporates excess water, and magnesium hydroxide granules may thus be prepared from such magnesia without any external heat energy.

The granulation will be further enhanced with the use of a magnesia having a particle size of less than 500 microns. Best results are obtained by agglomerating the finely divided magnesia to produce granules having a size at least 10 times that of the finely divided magnesia, granules having a size between about 0.1 mm and 50 mm being preferred.

An advantageous heat balance during agglomeration and hydration being obtained with the use of 0.5 to 1 part by weight of water per part by weight of the finely divided magnesia.

The start of the hydration of the magnesia may be initiated by subjecting the granules to external heat which may be minimal in view of the exothermic nature of the hydration reaction. Such heating may be exceedingly simple, for instance by adding warm water or by heating the granulating device wherein the magnesia is agglomerated. This has the advantage of initiating the hydration reaction even while the magnesia is agglomerated.

If the granulated mass is conducted through a conveying path, for instance on a conveyor band, the granules may be subjected to heat in the conveying path to start hydration quickly during the transfer of the granules. The heat may be supplied in the form of infrared radiation or by hot air, for instance.

It is also possible to introduce a heated rod into the mass of granules to initiate hydration at one site and the thus initiated hydration reaction will then spread through the entire mass of granules.

Furthermore, alone or in conjunction with any of the heating procedures outlined hereinabove, the start of the hydration reaction may be initiated by adding to the finely divided magnesia concentrated at one site a small amount of magnesia of a large specific surface. Magnesia of a large specific surface, such as microporous magnesia, is hydrated more readily and faster than ordinary magnesia.

The exothermic hydration reaction may be permitted to proceed without further subjecting it to heat after the reaction has been initiated, either spontaneously or by external heating.

It is not necessary to use pure magnesia as the starting material. Naturally occurring ore with its usual impurities may be used, such magnesia produced from natural magnesite without special purification.

If a residual amount of magnesia in the magnesium hydroxide end product makes no difference, an amount of water may be added to the finely divided magnesia sufficient for the agglomeration thereof but insufficient to hydrate all of the magnesia, which makes is possible more readily to control the granulation. In this case, the amount of water is preferably so chosen that at least 50%, by weight, of the magnesia is converted to magnesium hydroxide.

Throughout the specification and claims, a large specific surface is a surface, measured according to the B.E.T. method, of more than 75 sq.m./gram. Magnesia of such large specific surface is designated as "highly active".

In the above-described known process, such highly active magnesia is produced from the dried magnesium hydroxide by the thermal decomposition thereof, with all the attendant requirements for apparatus, energy and time. All this is avoided according to the invention because the autogenous dried granules resulting from the hydration of the magnesia may be thermally decomposed to become magnesia of a large specific surface. If desired, the resultant magnesia may be ground. The thermal decomposition temperature may be between about 300° C and 500° C. In this range, a product of particularly large specific surface, for instance up to 200 sq.m./g., may be obtained.

Since the magnesium hydrate is in relatively stable granular form, practically no dusting problem occurs during the thermal decomposition thereof. The thermal decomposition causes no comminution of the granules so that the end product is granulated, highly active magnesia which may be readily ground in any suitable comminuting apparatus, the grinding being particularly simple because of the high porosity of the product. Comminution may proceed to particle sizes below 10 microns.

The resultant magnesia is very useful, for instance, as a catalyst, a catalyst carrier or an adsorbent. It is also useful in finely divided form as a filler in elastomers or adhesives.

Without being limitative, the following examples illustrate the practice of the present invention.

EXAMPLE 1

Fifty kilograms of magnesia having a particle size of less than 500 microns and produced by the thermal decomposition of natural magnesite ore at about 800° C, commercially available as "caustically burnt magnesite", was granulated by adding thereto 28 liters of water as a binding agent. The water addition rate was so controlled that the resultant granules had a diameter of about 5 mm. (Like results were obtained by so controlling the water addition that the resultant granules had diameters between 0.1 mm and 50 mm.)

The mass of granules was divided into two halves.

One half of the granules was placed into an open container and left there. The hydration reaction proceeded slowly and was completed after about 360 minutes. The exothermic reaction caused excess water to evaporate and, after completion of the reaction, only dried granules remained in the container, an analysis of the dried mass of magnesium hydroxide granules showing a humidity of 0.5% and an ignition loss of 30.8% after calcining the granules for 2 hours at a temperature of 1050° C. The humidity was determined by comminuting a test sample of the granules to sufficient fineness for analysis, weighing the test sample, then washing the weighed sample with alcohol to remove all water, removing the alcohol, and then again weighing the sample, the difference in the weight between the first and second weighing giving the percentage of humidity.

The product had an $SiO_2$ content of 0.8%, an $Fe_2O_3$ content of 0.8%, an $Al_2O_3$ content of 0.1%, a CaO content of 4.5% and $SO_4''$ content of 0.3%, and a Cl' content of 0.1%.

The second half of the granules was also placed into a container but the hydration reaction was initiated by locally heating the mass of granules for a short time, this heating being effected by heating a small portion of the container bottom. This reduced the hydration time to 90 minutes. The resultant product was identical.

EXAMPLE 2

Fifty kilograms of magnesia produced by calcining seawater magnesium hydroxide and commercially available as such was granulated by adding thereto 35 liters of water as a binding agent, the water addition rate being so controlled that the resultant granules had a diameter of 15 mm. As indicated in Example 1, like results were obtained by controlling the water addition so as to obtain other granule diameters. The mass of granules was again divided into two halves.

One half of the granules was placed into an open container and left there, the hydration being completed within 240 minutes and the resultant magnesium hydroxide granules having a humidity of 1.2% and an ignition loss of 31.9% under conditions analogous to those of Example 1. The product analyszed to 1% $SiO_2$, 1.4% $Fe_2O_3$, 0.4% $Al_2O_3$, 0.8% CaO, 1% $So_4'$ and 0.2% Cl'.

The other half of the granules was also placed into a container and a heated rod was introduced into the mass to initiate the hydration reaction at one site, thus reducing the hydration time to 60 minutes. The product was identical to that of the first half.

EXAMPLE 3

Fifty kilograms of magnesia produced by the thermal decomposition of a magnesium chloride solution at 650° C was granulated by the addition of 25 liters of water as a binding agent, the water addition rate being so controlled that the resultant granules had a diameter of 2 to 3 mm.

One half of the granules was placed in a container and left there, the hydration being completed within about 150 minutes and the resultant magnesium hydroxide granules having a humidity of 1% and an ignition loss of 32.7% under conditions analogous to those of Example 1. The product analyzed to 0.005% $SiO_2$, 0.02% $Fe_2O_3$, 0.01% $Al_2O_3$, 0.9% CaO, 1.5% $SO_4''$ and 0.6% Cl'.

The other half of the granules was also placed into an open container and treated like the other half in Example 2, with identical results.

EXAMPLE 4

Fifty kilograms of the magnesia used as starting material in Example 1 was granulated by adding thereto 18 liters of water as a binding agent to obtain granules similar to those of Example 1 but the water amount was sufficient for the hydration of only a portion of the magnesia, as determined by the ignition loss of the granules which was only 20.7%.

EXAMPLE 5

Example 2 was repeated with the addition of only 20 liters of water to produce only partial hydration of the magnesia, as determined by the ignition loss of the granules which was only 24.7%.

EXAMPLE 6

Example 3 was repeated with the addition of only 15 liters of water to produce only partial hydration, as determined by the ignition loss of the granules which was only 19.7%.

EXAMPLE 7

Both halves of the autogenously dried magnesium hydroxide granules obtained according to Example 1 were subjected to a thermal treatment at about 450° C in an indirectly heated rotary kiln. At an output of about 5 kg/hour, highly active magnesia was produced in the kiln.

After each hour, a test sample was removed from the kiln and the ignition loss as well as the specific surface (according to the B.E.T. method) of the sample product was determined. The average value of all measurements was an ignition loss of about 5.8%, rising to about 8.1% for those samples having the largest specific surface. The average specific surface was 183 sq.m./g., with a maximum value of 204 sq.m./g.

EXAMPLE 8

The autogenously dried magnesium hydroxide granules of Example 2 were subjected to the same thermal decomposition treatment as used in Example 7. The test samples removed from the kiln showed an average ignition loss of 7.2% rising to 7.6% at the largest specific surface. The average specific surface of the product was 150 sq.m./g., with a maximum value of 161 sq.m./g.

EXAMPLE 9

The autogenously dried magnesium hydroxide granules of Example 3 were subjected to the same thermal decomposition treatment as used in Example 7. The test samples showed an average ignition loss of 6.5%, falling to 6% at the largest specific surface. The average specific surface of the samples was 135 sq.m./g., with maximum value of 144 sq.m./g.

The data and values of analysis for Examples 7 to 9 are shown in following Table I.

TABLE I

| Example | 7 | 8 | 9 |
|---|---|---|---|
| Amount of starting material (kg) | 50 | 50 | 50 |
| Addition of water (liter) | 28 | 35 | 25 |
| Hydration time (minutes-approximate) | | | |
| without external heating | 360 | 240 | 150 |
| with external heating | 90 | 60 | 60 |
| Humidity (weight %) | 0.5 | 1.2 | 1.0 |
| Ignition loss (2 h at 1050° C) (weight%) | 30.8 | 31.9 | 32.7 |
| Chemical analysis of the dried $Mg(OH)_2$ granules (calculated free of ignition loss) (weight%): | | | |
| $SiO_2$ | 0.8 | 1.0 | 0.005 |
| $Fe_2O_3$ | 0.8 | 1.4 | 0.02 |
| $Al_2O_3$ | 0.1 | 0.4 | 0.01 |
| CaO | 4.5 | 0.8 | 0.9 |
| $So_4''$ | 0.3 | 1.0 | 1.5 |
| $Cl'$ | 0.1 | 0.2 | 0.6 |
| Analysis of the activated magnesia granules: | | | |
| Average ignition loss (weight%) | 5.8 | 7.2 | 6.5 |
| Ignition loss at maximal specific surface (weight%) | 8.1 | 7.6 | 6.0 |
| Specific surface (according to B.E.T. method) (sq.m./g.) | | | |
| average value | 183 | 150 | 135 |
| maximum value | 204 | 161 | 144 |

EXAMPLE 10

The autogenously dried granules of Example 4 were subjected to the same thermal decomposition treatment used in Example 7. The tests showed an average ignition loss of 8.3%, falling to 5.2% at the largest specific surface. The average specific surface of the test samples was 104 sq.m./g., with a maximum value of 134 sq.m./g.

EXAMPLE 11

The autogenously dried granules of Example 5 were subjected to the same thermal decomposition used in Example 7, with the test showing an average ignition loss of 7.4% falling to 6.5% at maximum specific surface. The average specific surface was 122 sq.m./g., with the maximum being 138 sq.m./g.

EXAMPLE 12

The autogenously dried granules of Example 6 were subjected to the thermal decomposition treatment of Example 7, with the tests showing an average ignition loss of 6%, rising to 7% at maximum specific surface. The average specific surface was 78 sq.m./g., with maximum value being 108 sq.m./g.

The data and values of analysis for Examples 10 to 12 are shown in following Table II.

TABLE II

| Example | 10 | 11 | 12 |
|---|---|---|---|
| Amount of starting material (kg) | 50 | 50 | 50 |
| Addition of wter (1) | 18 | 20 | 15 |
| Analysis of autogeneously dried granules: | | | |
| Humidity (weight%) | 0.8 | 1.7 | 1.5 |
| Ignition loss (2 h at 1050° C) (weight%) | 20.7 | 24.7 | 19.7 |
| Analysis of the magnesia granules: | | | |
| Average ignition loss (weight%) | 8.3 | 7.4 | 6.0 |
| Ignition loss at maximum specific surface (weight%) | 5.2 | 6.5 | 7.0 |
| Specific surface (according to B.E.T. method) (sq.m./g.) | | | |
| average value | 104 | 122 | 78 |
| maximum value | 134 | 138 | 108 |

I claim:

1. A process for preparing insulation magnesium hydroxide, comprising the steps of adding to a mass of finely divided magnesia an amount of water sufficient to act as a binding agent for the finely divided magnesia granulating the mass to form granules and subjecting the granules to an exothermic hydration reaction for hydrating at least 50%, by weight, of the magnesia with the added water.

2. The process of claim 1, comprising the steps of thermally decomposing the autogenously dried magnesium hydroxide to obtain magnesia of a large specific surface.

3. The process of claim 2, further comprising the step of subjecting the magnesia mass to heat to initiate the hydration reaction.

4. The process of claim 3, wherein the magnesia mass is subjected to heat in the form of warm water.

5. The process of claim 4, wherein the magnesia is granulated in a granulating device and the granules are subjected to heat by heating the granulating device.

6. The process of claim 4, wherein the granules are conducted through a conveying path and the granules are subjected to heat in the conveying path.

7. The process of claim 4, wherein the granules are subjected to heat by introducing a heated rod into the mass of granules.

8. The process of claim 4, wherein the hydration reaction is permitted to proceed without further subjecting it to heat after the reaction has been initiated.

9. The process of claim 2, wherein the finely divided magnesia is granulated to produce granules having a size at least ten times that of the finely divided magnesia.

10. The process of claim 9, wherein the granules have a size between about 0.1 mm and 50 mm.

11. The process of claim 2, further comprising the step of adding to the finely divided magnesia which is provided for producing granules concentrated at one site a small amount of magnesia of a large specific surface.

12. The process of claim 2, comprising the further step of grinding the magnesia of a large specific surface yield from said magnesium hydroxide.

13. The process of claim 2, wherein an amount of water is added to the finely divided magnesia sufficent for the granulating thereof but insufficient to hydrate all of the magnesia.

14. The process of claim 2, wherein about 0.5 to 1 part by weight of water is added per part by weight of the finely divided magnesia.

15. The process of claim 2, wherein the finely divided magnesia is a product calcined at temperatures below 1200° C.

16. The process of claim 2, wherein the finely divided magnesia is a product having a particle size of less than 500 microns.

17. The process of claim 2, wherein the magnesium hydroxide is thermally decomposed at a temperature between about 300° C and 500° C.

18. The process of claim 1, further comprising the step of subjecting the magnesia mass to heat to initiate the exothermic hydration reaction.

19. The process of claim 18, further comprising the step of adding to the finely divided magnesia concentrated at one site a small amount of magnesia of a large specific surface to initiate the hydration reaction.

20. The process of claim 19, wherein the magnesia of large specific surface is microporous.

21. The process of claim 18, wherein the granules are conducted through a conveying path and the granules are subjected to heat in the conveying path.

22. The process of claim 18, wherein the granules are subjected to heat by introducing a heated rod into the mass of granules.

23. The process of claim 18, wherein the granules are subjected to heat during granulating.

24. The process of claim 18, wherein the granules are subjected to heat after granulating.

25. The process of claim 18, wherein the exothermic hydration reaction is permitted to proceed without further subjecting it to heat after the reaction has been initiated.

26. The process of claim 18, wherein the granules are subjected to heat in the form of warm water.

27. The process of claim 18, wherein the magnesia is granulated in a granulating device and the magnesia mass is subjected to heat by heating the granulating device.

28. The process of claim 1, wherein the finely divided magnesia is granulated to produce granules having a size at least ten times that of the finely divided magnesia.

29. The process of claim 28, wherein the granules have a size between about 0.1 mm and 50 mm.

30. The process of claim 1, wherein the magnesia is a product calcined at temperatures below 1200° C.

31. The process of claim 1, wherein the magnesia is a product having a particle size of less than 500 microns.

32. The process of claim 1, wherein an amount of water is added to the finely divided magnesia sufficient for the granulating thereof but insufficient to hydrate all of the magnesia.

33. The process of claim 1, wherein about 0.5 to 1 part by weight of water is added per part by weight of the finely divided magnesia.

* * * * *